US010129039B2

(12) United States Patent
Li et al.

(10) Patent No.: US 10,129,039 B2
(45) Date of Patent: Nov. 13, 2018

(54) METHOD OF ONLINE CHARGING A GUEST USER OF AN APPLICATION CONTENT PROVIDER

(71) Applicant: ALCATEL LUCENT, Paris (FR)

(72) Inventors: Xiangyang Li, Shanghai (CN); Yigang Cai, Naperville, IL (US)

(73) Assignees: Alcatel Lucent, Nozay (FR); Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 14/354,261

(22) PCT Filed: Oct. 18, 2012

(86) PCT No.: PCT/IB2012/002542
§ 371 (c)(1),
(2) Date: Apr. 25, 2014

(87) PCT Pub. No.: WO2013/061154
PCT Pub. Date: May 2, 2013

(65) Prior Publication Data
US 2014/0286199 A1    Sep. 25, 2014

(30) Foreign Application Priority Data

Oct. 27, 2011    (CN) .......................... 2011 1 0344544

(51) Int. Cl.
*H04L 12/14*    (2006.01)
*H04L 29/06*    (2006.01)
*H04M 15/00*    (2006.01)

(52) U.S. Cl.
CPC ...... *H04L 12/1407* (2013.01); *H04L 12/1403* (2013.01); *H04L 12/1467* (2013.01);
(Continued)

(58) Field of Classification Search
None
See application file for complete search history.

(56) References Cited

U.S. PATENT DOCUMENTS

2008/0205381 A1\* 8/2008 Zhu ........................ G06Q 20/10
370/352
2010/0085937 A1\* 4/2010 Pressley .................. H04W 8/06
370/331

(Continued)

FOREIGN PATENT DOCUMENTS

CN 101222482 A 7/2008
CN 101622819 A 1/2010
(Continued)

OTHER PUBLICATIONS

"3$^{rd}$ Generation Partnership Project; Technical Specification Group Core Network Subsystem Cx and Dx interfaces; Signalling flows and message contents (Release 11)," 3GPP TS 29.228 V11.1.0, pp. 1-70, XP050553894, Sep. 2011.
(Continued)

*Primary Examiner* — Donald Mills
(74) *Attorney, Agent, or Firm* — Fay Sharpe LLP

(57) ABSTRACT

The invention proposes a method of integrating a service of an application content provider in an IMS core network, and the method includes the step of: allowing a network user to click-to-dial a mobile caller by using a network account. Preferably the step of allowing a network user to click-to-dial a mobile caller by using a network account is performed by providing an open application program interface between the application content provider and a call session control function.

4 Claims, 6 Drawing Sheets

(52) U.S. Cl.
CPC ........ *H04L 63/0876* (2013.01); *H04L 63/101* (2013.01); *H04L 65/1016* (2013.01); *H04L 65/1046* (2013.01); *H04L 65/1073* (2013.01); *H04M 15/62* (2013.01); *H04M 15/64* (2013.01)

(56) References Cited

U.S. PATENT DOCUMENTS

| | | | | |
|---|---|---|---|---|
| 2011/0003579 | A1* | 1/2011 | Cai | G06Q 20/14 455/408 |
| 2011/0093933 | A1* | 4/2011 | Lindholm | H04L 63/107 726/5 |
| 2011/0170455 | A1* | 7/2011 | Cai | H04L 12/1403 370/259 |
| 2012/0011273 | A1* | 1/2012 | Van Elburg | H04L 65/1073 709/238 |
| 2012/0295585 | A1* | 11/2012 | Khan | H04L 12/14 455/406 |
| 2013/0019012 | A1* | 1/2013 | Henrikson | H04L 65/1016 709/225 |

FOREIGN PATENT DOCUMENTS

| | | |
|---|---|---|
| CN | 101911615 A | 12/2010 |
| CN | 101960778 A | 1/2011 |

OTHER PUBLICATIONS

"3$^{rd}$ Generation Partnership Project; Technical Specification Group Services and System Aspects; Telecommunication management; Charging management; IP Multimedia Subsystem (IMS) charging (Release 11)," 3GPP TS 32.260 V11.1.0, pp. 1-138, XP050553979, Sep. 2011.

"3$^{rd}$ Generation Partnership Project; Technical Specification Group Services and System Aspects; Telecommunication management; Charging management; Charging architecture and principles (Release 11)," 3GPP TS 32.240 V11.1.0, pp. 1-45, XP050553969, Sep. 2011.

3$^{rd}$ Generation Partnership Project; Technical Specification Group Core Network and Terminals; Numbering, addressing and identification (Release 10), 3GPP TS 23.003 V10.3.0, pp. 1-80, XP050553806, Sep. 2011.

International Search Report for PCT/IB2012/002542 dated Sep. 13, 2013.

"3rd Generation Partnership Project; Technical Specification Group Services and System Aspects; 3G security; Access security for IP-based services (Release 11)", 3GPP TS 33.203 V11.0.0 (Dec. 2010), Technical Specification, 114 pages.

"3rd Generation Partnership Project; Technical Specification Group Core Network and Terminals; Cx and Dx interfaces based on the Diameter protocol; Protocol details (Release 10)", 3GPP TS 29.229 V10.1.0 (Jun. 2011), Technical Specification, 36 pages.

* cited by examiner

METHOD OF ONLINE CHARGING A GUEST USER OF AN APPLICATION CONTENT PROVIDER

FIELD OF THE INVENTION

The present disclosure relates to an Internet Protocol multimedia subsystem and particularly to a method in an Internet Protocol multimedia subsystem, of online charging a guest user of an application content provider.

BACKGROUND OF THE INVENTION

A Social network and AN Application Content Provider (ACP) often neither interoperate with each other nor interoperate across different access networks. In addition, a social network and an ACP have no solid business plan, thus hurting the traditional telecommunication industry. For example, Skype is looking at advertising to keep a communication service free. An Application Exposure Suite (AES) is intended to provide network operators with the ability to expose open Application Program Interfaces (APIs) to an external third party and an internal application in a secure and controlled manner. With the AES, an ACP or an application content platform (including all of social networks) can interoperate with a telecommunication network in supporting network based services from the application platform.

However, a social network user or an application content user may not be a user of the telecommunication network. The social network user or the application content user may register with the telecommunication network as guest users in the services. This brings a problem of how to charge these guest users in the existing IMS charging architecture when an Online Charging System has no account balance or other data available in supporting the services in the telecommunication network.

SUMMARY OF THE INVENTION

In order to address the foregoing technical problem, there is provided according to a first aspect of the invention a method, in a serving-call session control function of an IP multimedia subsystem, of providing online charging for a guest user who has subscribed to a service of an application content provider, the method including the steps of: transmitting an authentication request to a home user server or the application content provider when a registration request from an interrogating-call session control function is received, the authentication request including a domain name of the user; receiving a response message from the home user server or the application content provider, the response message including information indicating whether the domain name is included in a list of legal public user identities in the home user server or the application content provider; and triggering an online charging procedure for the user when the domain name is included in the list of legal public user identities.

According to a second aspect of the invention, there is provided a method, in an online charging system of an IP multimedia subsystem, of performing online charging for a guest user who has subscribed to a service of an application content provider, the method including the steps of: receiving a credit control request from a serving-call session control function, the credit control request including an identity of the guest user and a domain name of the guest user; querying the application content provider or an external payment account of the guest user about account information of the guest user according to the domain name of the guest user; and obtaining the account information of the guest user from the application content provider or the external payment account, and creating a temporary account in the online charging system for the guest user for online charging according to the account information.

According to a third aspect of the invention, there is provided a method, in an interrogating-call session control function of an IP multimedia subsystem, of authenticating a user, the method including the steps of: transmitting an authentication request to a home user server, the authentication request including a domain name of the user; receiving a response message from the home user server, the response message including information indicating whether the domain name is included in a list of legal public user identities; and initiating a registration request to a serving-call session control function when the domain name is included in the list of legal public user identities.

According to a fourth aspect of the invention, there is provided a method, in a home user server of an IP multimedia subsystem, of storing charging information of a guest user who has subscribed to a service of an application content provider, the method including the steps of: configuring a public user identity and an available serving-call session control function for the application content provider; receiving an authentication request from an interrogating-call session control function, the authentication request including a domain name of the user; determining whether the domain name in the authentication request is included in a list of legal public user identities; and transmitting a response message to the interrogating-call session control function when the domain name in the authentication request is included in the list of legal public user identities, the response message including a serving-call session control function corresponding to the user; or transmitting a response message to the interrogating-call session control function when the domain name in the authentication request is not included in the configured public user identities, the response message indicating that no match information is found and the call is rejected.

According to a fifth aspect of the invention, there is provided a method of integrating a service of an application content provider in an IMS core network, the method including the step of:—allowing a network user to click-to-dial a mobile caller by using a network account.

With the solution of the invention, a new functional module in an IMS network is created to support online charging for a user of an application content platform, which is a guest user of an online charging system. With the solution of the invention, an ACP user can be allowed to access an IMS service directly without waiting for a service provider to configure data for the user in an HSS. The invention improvise the competitively of the service provider by providing for the service provider more multimedia as well as more extensive interaction with a social network and an application content provider.

BRIEF DESCRIPTION OF DRAWINGS

Other features, objects and advantages of the invention will become more apparent upon review of the following detailed description of non-limiting embodiments taken with reference to the drawings in which.

Throughout the drawings, identical or similar reference numerals represent identical or similar step features or devices/modules.

DETAILED DESCRIPTION OF EMBODIMENTS

I. Architecture of IMS Network with Accessing Application Guest

Figure 1:
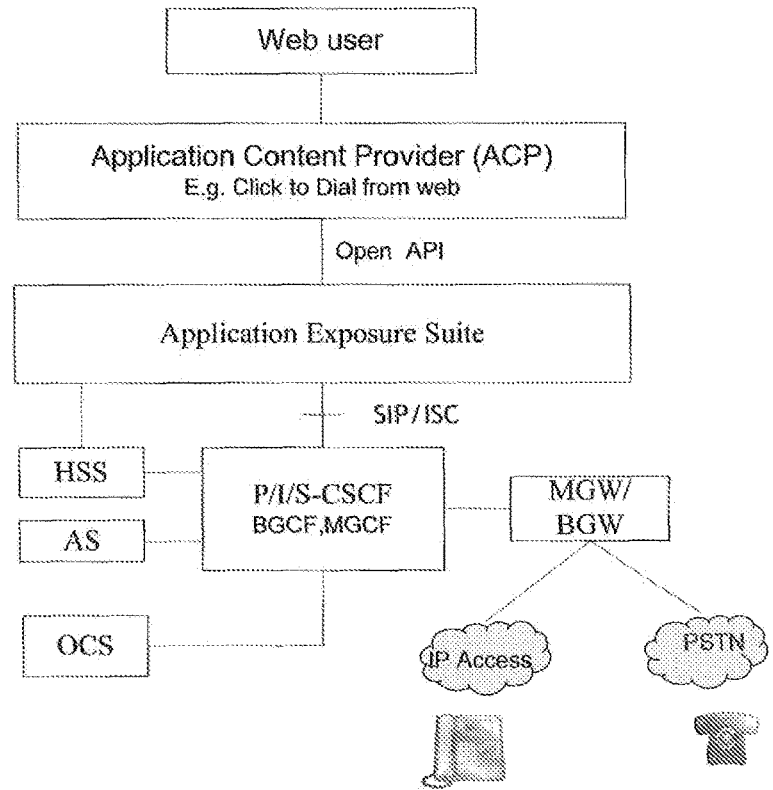
FIG. 1 illustrates a schematic diagram of an IMS network with a click-to-dial service through a network account according to an embodiment of the invention.

FIG. 1 illustrates a schematic diagram of a general network of IMS network with an ACP, a partner application or a web application accessing an IMS network service according to an embodiment of the invention, where the ACP, the partner application or the web application which provides a multimedia service from web clicking-to-dialing allows a web user to click-to-dial a mobile caller from a web portal.

A typical interface between the ACP and an end user (the web user) is an HTTP interface. An application client provided by the ACP is downloaded to an end user device via the HTTP. The ACP provides each of its end-users with a user ID and password for authentication. An interface between the ACP and an AES is a standardized (RESTful API) (IMS enabler).

An ACP user is allowed to register with an IMS with or without requiring a data entry per user in an HSS of the IMS. Following a general agreement between the ACP and an IMS network operator, the HSS will configure for each ACP a Public User ID (PUID) (applicable to all or a part of ACP users) with domain name identification, where an allowed ACP user will get a wildcard PUID in the HSS. Or the HSS configure a unique PUID for each ACP user based on identification of the ACP user. The ACP shall provide for the IMS network these users as online charged users to thereby allow the HSS to configure either wildcards or unique PUIDs for these users as online charged guest users. The ACP and an IMS service provider agree that an ACP user can be identified by a domain name, e.g., @acp.com. The IMS service provider configures its HSS as follows:

A domain name of the ACP (e.g., @scp.com) to identify its users;

An IMS core network will save a list of allowed domain names, which is used to determine when to request registration authentication from the ACP/the application; and The HSS is configured to include a domain name of the application, an S-CSCF in use, filter criteria, capabilities, etc.

A P/I/S-CSCF registers a web user as an online charged guest user in the HSS of the IMS for any IMS service as per the agreement between the ACP and the network provider (assumed a wholesale model partnership). When the guest user starts a multimedia service in the IMS network from the web portal, the Serving-Call Session Control Function (S-CSCF) and an Application Server (AS) are able to identify the guest user as an online charged user and to trigger an online charging request to an OCS. This allows an immediate access of the ACP user to the IMS service without having to wait for the service provider to configure data per user in the HSS.

II. Online Charging for Guest User

Figure 2:
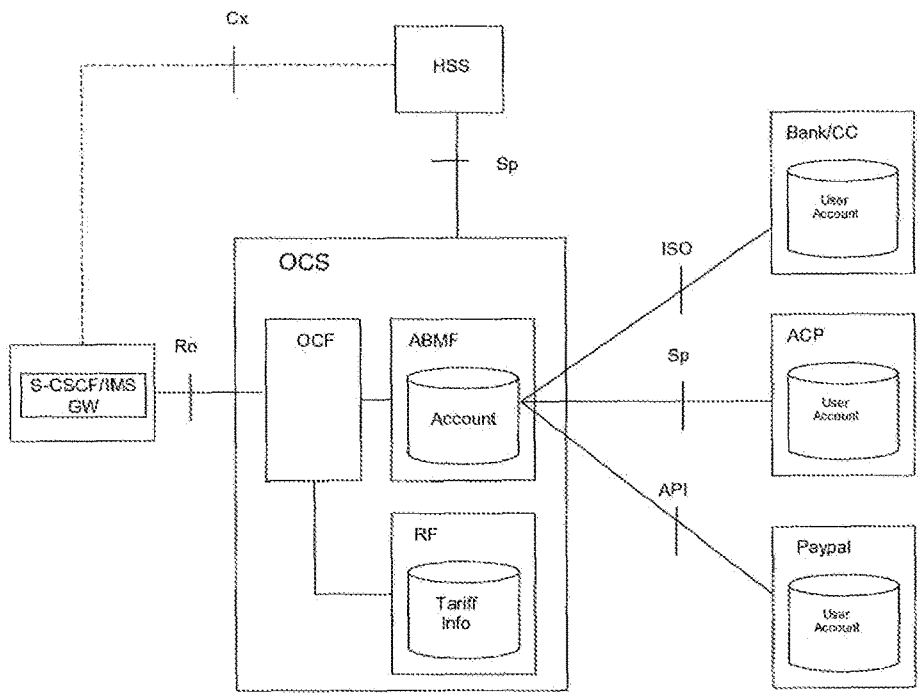
FIG. 2 illustrates an online charging system for a guest user according to an embodiment of the invention.

A core of the invention lies in how an OCS provides real time charging for an ACP guest user in an IMS network. This section gives inventive steps. FIG. 2 illustrates a schematic diagram of an online charging architecture with an ACP guest.

An OCS receives a Diameter Credit Control Request (CCR) from a Serving-Call Session Control Function (S-CSCF) or an IMS Gateway (IMS-GW) for online charging for a guest user. The CCR can include an identity and a domain name (an ACP) of the guest user or optionally a payment option of the guest user, e.g., rating, etc.

The OCS optionally can query an HSS for other charging information of the guest user if the HSS stores the information. The OCS normally has account information of the guest user in an Account Balance Management Function (ABMF). When the OCS knows the identity and the payment option of the guest user, the OCS firstly rates the call using a rating engine based on a tariff plans pre-stored in the OCS. Then the OCS obtains user charging information, e.g., an allowed online charging credit, by 1) querying an ACP account database via Sp or other Application Protocol Interfaces (APIs) or 2) querying a bank or a credit card center via a standard ISO interface or 3) querying any other finance institute or method indicated by the ACP or the HSS. The OCS may establish a temporary account for the guest user for online charging in the IMS network. The OCS can obtain an additional credit from the ACP or the finance institute if the existing credit is exhausted.

The OCS responds to the S-CSCF/IMS-GW with a Credit Control Answer (CCA) including the allowed credit for an IMS service. The S-CSCF/IMS-GW will monitor the call or the service. When either caller ends the call, the S-CSCF/IMS-GW will send a CCR [Final] to the OCS and report the remaining credit to the OCS. Specifically, the IMS-GW reports a real length of time of the call to the OCS, and the OCS calculates a real fee from the real length of time of the call and returns the remaining reserved money to the account of the user. The OCS can keep the credit in the temporary account of the guest user in the OCS or return the credit to the ACP or the finance institute.

III. Call Flows

1. Guest User Registers with IMS Network for Online Charged User Profile

Figure 3:
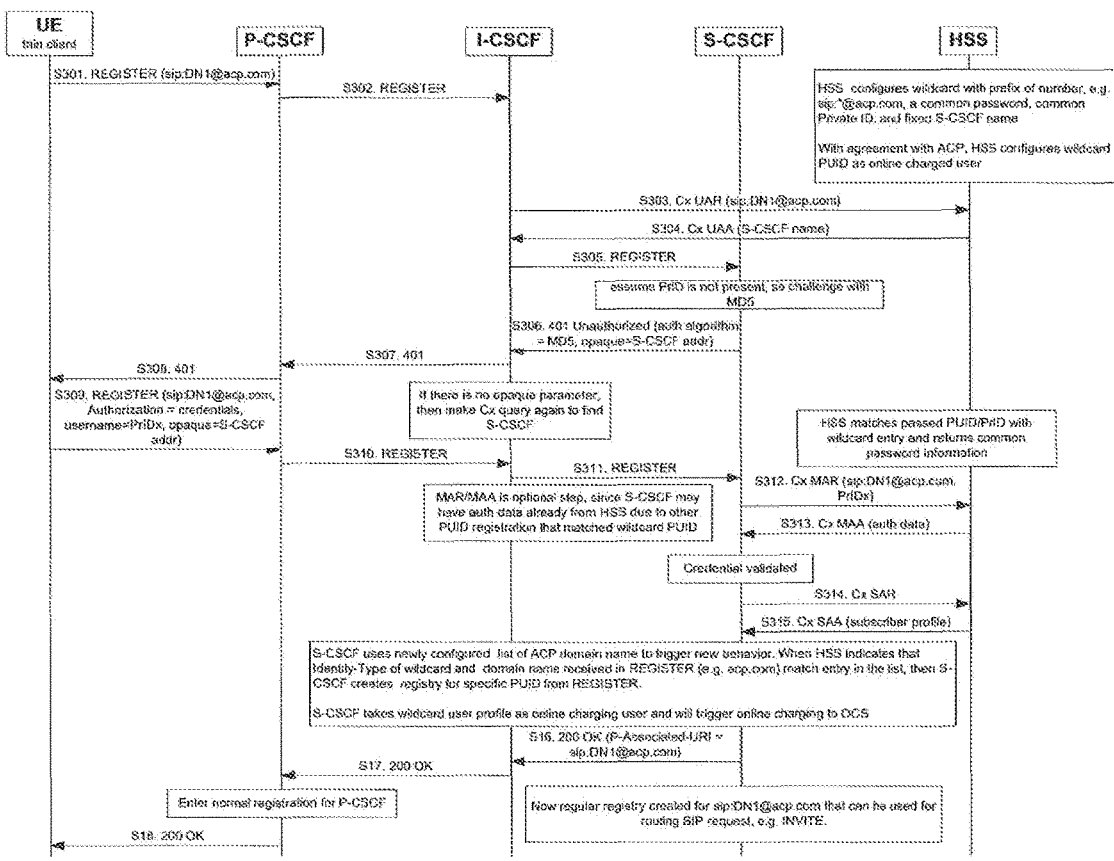
FIG. 3 illustrates a call flow chart of registration of a guest user according to an embodiment of the invention.

FIG. 3 illustrates an example call flow in which an ACP user registers with an IMS network and an HSS configures and authenticates the user as a wildcard online charged user and distributes a user profile to an S-CSCF. The HSS will configure for each ACP a Public User ID (PUID) (applicable to all or a part of ACP users) with domain identification of the PUID from which an allowed ACP user will obtain a wildcard PUID in the HSS.

Firstly in the step S301, a user equipment initiates a registration request to a P-CSCF, for example, the user equipment transmits an SIP request, sip: DN1@acp.com. Then in the step S302, the P-CSCF forwards the registration request to an I-CSCF. The HSS configures a prefix of numbers for a wildcard, e.g., sip: *@acp.com, a common password, a common private ID (PrID) and a fixed S-CSCF name. With an agreement with the ACP, the HSS configures the wildcard PUID as an online charged user.

Then the HSS matches the passed PUID/PrID with a wildcard entry and returns the password information.

Then in the step S303, the I-CSCF transmits a Cx User Authorization Request (UAR), sip: DN1@acp.com, to the HSS. Then in the step S304, the HSS transmits a Cx User Authorization Answer (UAA) to the I-CSCF. Then in the step S305, the I-CSCF registers with the S-CSCF. The S-CSCF assumes absence of the PrID and thus challenges with MD5.

Then in the step S306, the S-CSCF transmits 401 Unauthorized (auth algorithm=MD5, opaque=S-CSCF addr) to the I-CSCF. Then in the step S307, the I-CSCF transmits 401 to the P-CSCF.

Then in the step S308, the P-CSCF transmits 401 to the user equipment.

Then in the step S309, the user equipment initiates registration again (sip:DN1@acp.com, Authorization=credentials, username=PrIDx, opaque=S-CSCF addr). Then in the step S310, the P-CSCF initiates registration to the I-CSCF.

The I-CSCF makes a Cx interface query again to find the S-CSCF if there is no opaque parameter until the step S309.

Then in the step S311, the I-CSCF initiates registration to the S-CSCF. Then in the step S312, the S-CSCF initiates a Cx multimedia authentication request (Multimedia-Auth-Request, MAR) (sip: DN1@aco.com, PrIDx) to the HSS. Then in the step S313, the HSS returns a Cx multimedia authentication answer (Multimedia-Auth-Answer, MAA) (auth data) to the S-CSCF. It shall be noted that MAR and MAA are optional steps because the S-CSCF may already have the authentication data from the HSS due to other PUID registration matching the wildcard PUID.

Then the S-CSCF checks the authentication information of the user for validity. Then in the step S314, the S-CSCF initiates a Cx Server-Assignment-Request (SAR) to the HSS. Then in the step S315, the HSS transmits a Cx Server-Assignment-Answer (SAA) including a user profile to the S-CSCF.

Then the S-CSCF uses a newly configured list of ACP domain names to trigger a new behavior. When the HSS indicates that Identity-Type of the wildcard and the domain name received in REGISTER match an entry in the list, the S-CSCF creates a registry for the specific PUID from REGISTER.

Then in the step S316, the S-CSCF transmits a 200 OK (P-Associated-URI=sip:DN1@acp.com) to the I-CSCF. Then in the step S317, the I-CSCF transmits a 200 OK to the P-CSCF. Then the P-CSCF enters normal registration. Then in the step S318, the P-CSCF transmits a 200 OK to the user equipment. Then the S-CSCF can route an SIP request, e.g., an INVITE message, because it has created the normal registry for sip:DN1@acp.com.

Figure 4:
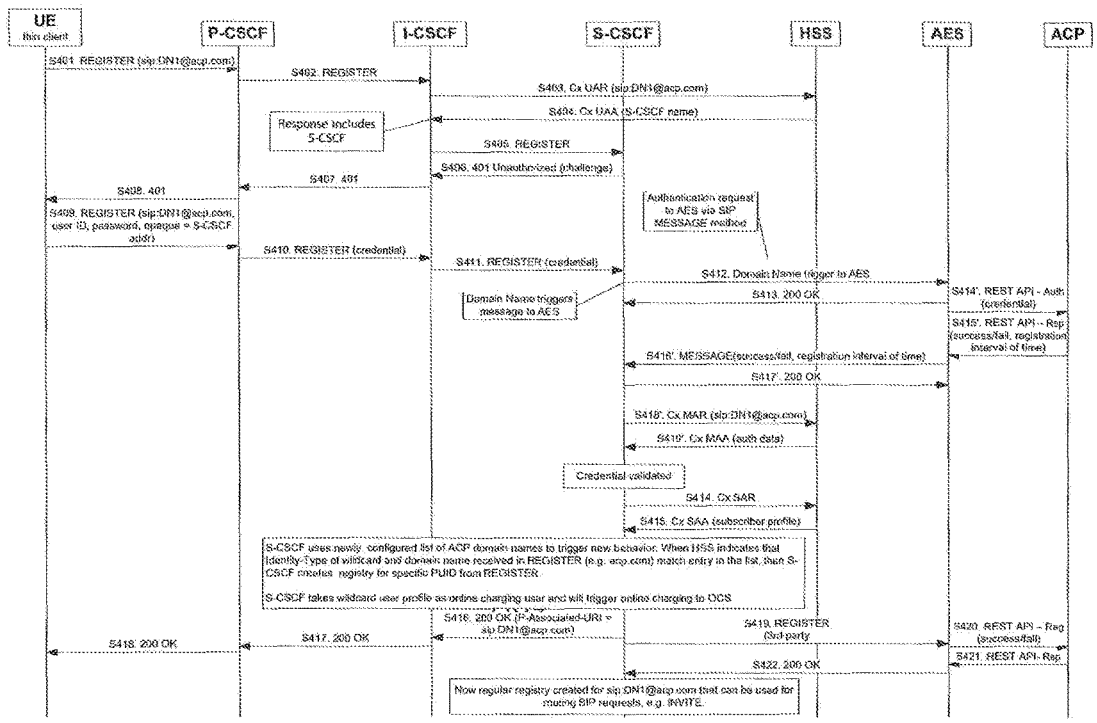
FIG. 4 illustrates a call flow chart of a registration example of an ACP guest user according to an embodiment of the invention; and FIG. 5(a) to FIG. 5(c) illustrates a call flow chart of a network account user clicking-to-dialing a mobile phone according to an embodiment of the invention.

FIG. 4 illustrates an example call flow in which an ACP user registers with an IMS network and the IMS authenticates the user to an AES or the ACP via a standard (RESTful) API. Upon successful registration and authentication from the ACP and the AES, the ACP provides online charging data of the guest user to the IMS network which in turn stores the data temporarily either in an HSS or in a cache of an S-CSCF or an AS. After the S-CSCF or the AS initiates online charging, the S-CSCF or the AS includes the data in a request transmitted to an OCS.

Firstly in the step S401, a user equipment initiates a registration request to a P-CSCF, for example, the user equipment transmits an SIP request, sip: DN1@acp.com. Then in the step S402, the P-CSCF forwards the registration request to an I-CSCF.

Then in the step S403, the I-CSCF transmits a Cx User Authorization Request (UAR), sip: DN1@acp.com, to the HSS. Then in the step S404, the HSS transmits a Cx User Authorization Answer (UAA) including the name of the S-CSCF to the I-CSCF. Then in the step S405, the I-CSCF registers with the S-CSCF. Then in the step S406, the S-CSCF transmits 401 Unauthorized (Challenge) to the I-CSCF. Then in the step S407, the I-CSCF transmits 401 to the P-CSCF. Then in the step S408, the P-CSCF transmits 401 to the user equipment.

Then in the step S409, the user equipment initiates registration again (sip:DN1@acp.com, user ID, password, opaque=S-CSCF addr). Then in the step S410, the P-CSCF initiates registration including authentication information (a credential) of the user to the I-CSCF. Then in the step S411, the I-CSCF initiates registration including the authentication information (the credential) of the user to the S-CSCF. Then in the step S412, the S-CSCF transmits a Domain Name trigger message to the AES. The S-CSCF requests the AES in the Domain Name trigger to verify the user information of the guest. Then in the step S413, the AES transmits a 200 OK answer message to the S-CSCF. Then in the step S414', the AES transmits a standard (REST) API to the ACP for authentication (authentication information of the user). Then in the step S415', the ACP transmits a standard (REST) API response (a success/failure and a registration interval of time) to the AES. Then in the step S416', the AES transmits a message including the success/failure and the registration interval of time to the S-CSCF. Then in the step S417', the S-CSCF transmits a 200 OK message to the AES. Then in the step S418', the S-CSCF initiates a Cx multimedia authentication request (Multimedia-Auth-Request, MAR) (sip: DN1@aco.com) to the HSS. Then in the step S419', the HSS returns a Cx multimedia authentication answer (Multimedia-Auth-Answer, MAA) (auth data) to the S-CSCF.

In the embodiment illustrated in FIG. 4, the ACP is intended to check information of a valid account stored by a content provider, and authentication by the HSS is intended to authenticate an allowed IMS service provided by an operation.

Then the S-CSCF checks the authentication information of the user for validity. Optionally in the step S414, the S-CSCF initiates a Cx Server-Assignment-Request (SAR) to the HSS. Then in the step S415, the HSS transmits a Cx Server-Assignment-Answer (SAA) including a user profile to the S-CSCF.

Then the S-CSCF uses a newly configured list of ACP domain names to trigger a new behavior. When the HSS indicates that Identity-Type of a wildcard and a domain name received in REGISTER match an entry in the list, the S-CSCF creates a registry for a specific PUID from REGISTER. Thus the S-CSCF takes the wildcard user as an online charged user and triggers online charging to the OCS.

Then in the step S416, the S-CSCF transmits a 200 OK (P-Associated-URI=sip:DN1@acp.com) to the I-CSCF. Then in the step S417, the I-CSCF transmits a 200 OK to the P-CSCF. Then in the step S418, the P-CSCF transmits a 200 OK to the user equipment. Then in the step S419, the S-CSCF transmits a registration request (Third Party) to the AES. Then in the step S420, the AES transmits REGISTER (Success/Failure) to the ACP via the standard API. Then in the step S421, the ACP transmits a standard API response to the AES.

The S-CSCF can route an SIP request, e.g., an INVITE message, because it has created the normal registry for sip:DN1@acp.com.

Figure 5A:
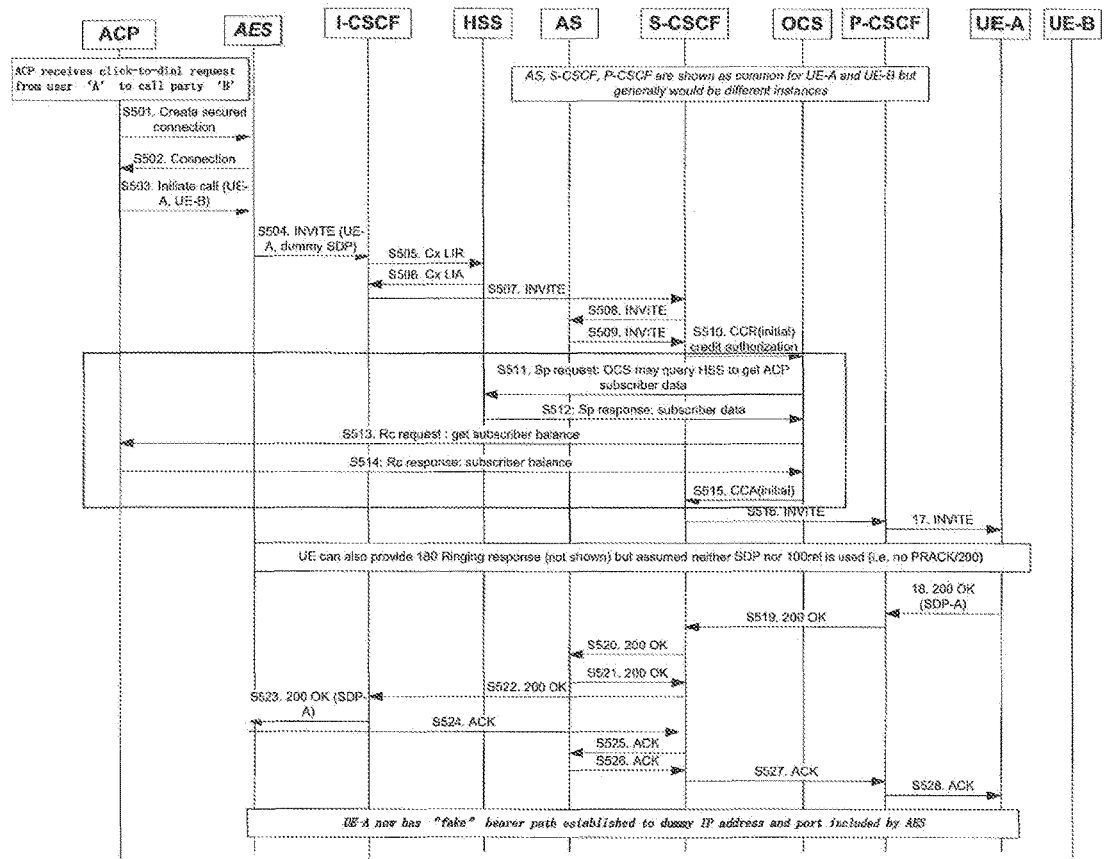
Figure 5B:
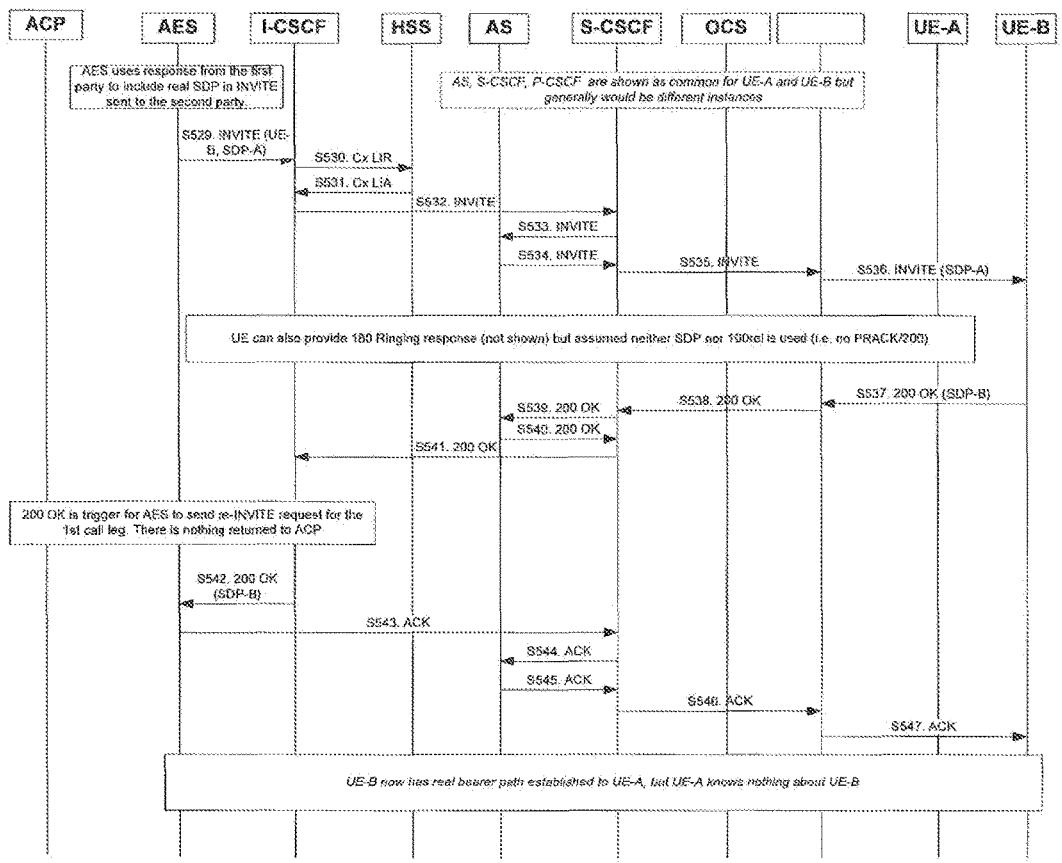
Figure 5C:
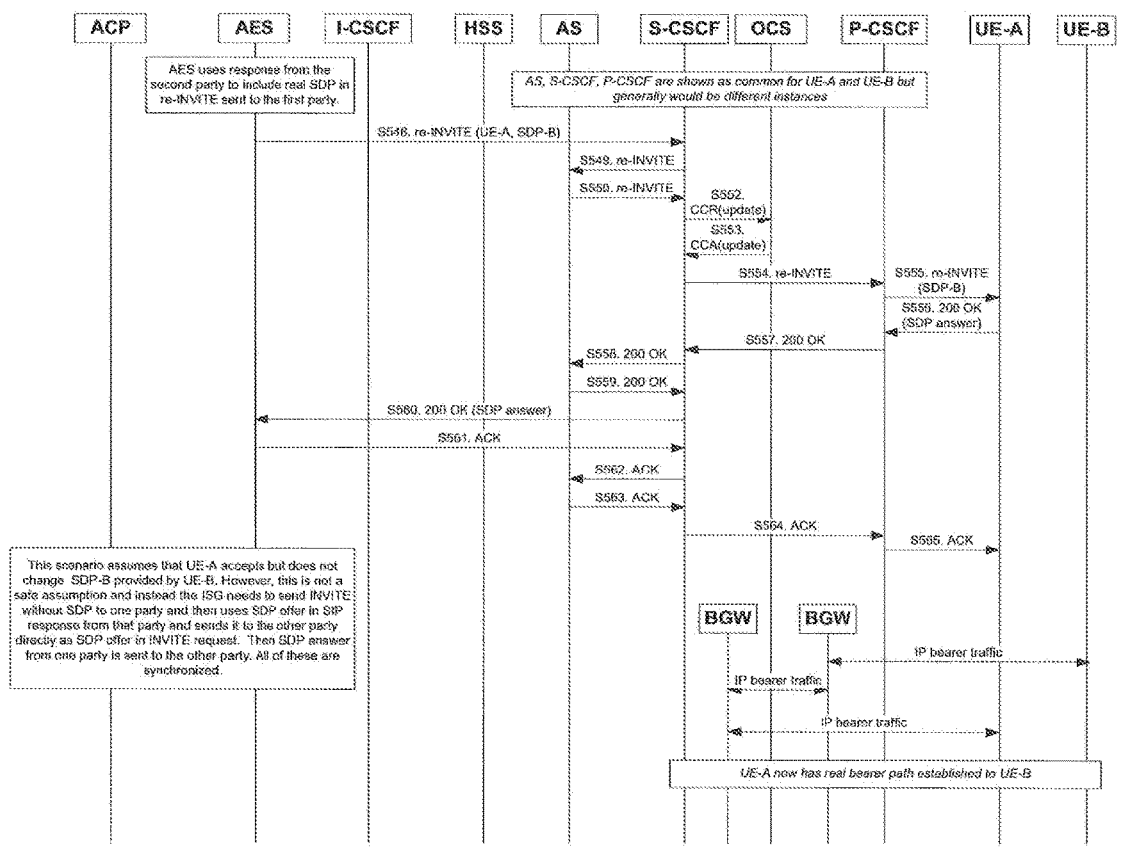

2. Example Message Flows for ACP Guest User Clicking to Dialing to Mobile Caller FIG. 5(a), FIG. 5(b) and FIG. 5(c) illustrate call flows of a web portal user, i.e., a guess user, clicking-to-dialing a mobile caller.

Assumed an ACP user A registers with an IMS network as an online charged guest user and uses an ACP web portal to click-to-dial to a mobile user B. In a specific implementation, web portal-based clicking-to-dialing to a mobile caller can be in numerous different forms or scenarios.

When data is stored in an HSS, an OCS can query the HSS to obtain the data. Online charging data can include but will not be limited to:

A user identity;
A charging type;
An account balance;
Payment information (an ACP account, a credit card account, a bank card account, etc.);
A payment upper limit per service;
A payment upper limit per day, per week, per month; and
Other information.

Reference is firstly made to FIG. 5(a). The ACP receives a click-to-dial request from the user A to call the user B. In the step S501, the ACP establishes a secured connection. Then in the step S502, an AES establishes a connection with the ACP. Then in the step S503, the ACP transmits a call request to the AES to establish a connection between the user A and the user B. Then in the step S504, the AES transmits an INVITE (user A, dummy SIP Description Protocol (SDP)) to an I-CSCF. Then in the step S505, the I-CSCF transmits a Location Information Request (LIR) to the HSS. Then in the step S506, the HSS transmits a Location Information Answer (LIA) to the I-CSCF. Then in the step S507, the I-CSCF transmits an INVITE to an S-CSCF. Then in the step S508, the S-CSCF transmits an INVITE to the AS. Then in the step S509, the AS transmits an INVITE to the S-CSCF. Then in the step S510, the S-CSCF transmits a CCR (initial) to the OCS for credit authentication. Then in the step S511, the OCS transmits a Sp request to the HSS, where the OCS can query the HSS to obtain data of an account in the ACP. Then in the step S512, the HSS returns a Sp response including the data of the account to the OCS. Then in the step S513, the OCS transmits an Rc request to the ACP to obtain balance information of the account. Then in the step S514, the ACP returns the balance information of the account to the OCS. Then in the step S515, the OCS returns a CCA (initial) to the S-CSCF. Then in the step S516, the S-CSCF transmits an INVITE to the P-CSCF. Then in the step S517, the P-CSCF transmits an INVITE to the user A. The user can also provide a 180 Ring response (not illustrated), but it is assumed here neither SDP nor 100rel is used (for example, there is no PRAC/200). Then in the step S518, the user A transmits a 200 OK (SDP-A) to the P-CSCF. Then in the step S519, the P-CSCF transmits a 200 OK to the S-CSCF. Then in the step S520, the S-CSCF transmits a 200 OK to the AS. Then in the step S521, the AS transmits a 200 OK to the S-CSCF. Then in the step S522, the S-CSCF transmits a 200 OK to the I-CSCF. Then in the step S523, the I-CSCF transmits a 200 OK to the AES. Then in the step S524, the AES transmits an ACK to the S-CSCF. Then in the step S525, the S-CSCF transmits an ACK to the AS. Then in the step S526, the AS transmits an ACK to the S-CSCF. Then in the step S527, the S-CSCF transmits an ACK to the P-CSCF. Then in the step S528, the P-CSCF transmits an ACK to the user A. Noted in this phase, the user A has a "fake" bearer path established to a dummy IP address and port included by the AES.

Then reference is made to FIG. 5(b) illustrating a flow immediately succeeding to the flow in FIG. 5(a). The AES uses the response from the first party (UE-A) to include a real SDP in an INVITE message transmitted sent to the second party (UE-B). Then in the step S529, the AES transmits an INVITE (UE-B, SDP-A) to the I-CSCF. Then in the step S530, the I-CSCF transmits a Cx LIR to the HSS. Then in the step S531, the HSS transmits a Cx LIA to the I-CSCF. Then in the step S532, the I-CSCF transmits an INVITE to the S-CSCF. Then in the step S533, the S-CSCF transmits an INVITE to the AS. Then in the step S534, the AS transmits an INVITE to the S-CSCF. Then in the step S535, the S-CSCF transmits an INVITE to the P-CSCF. Then in the step S536, the P-CSCF transmits an INVITE to the user B. The user can also provide a 180 Ring response (not illustrated), but it is assumed here neither SDP nor 100rel is used (for example, there is no PRAC/200).

Then in the step S537, the user B transmits a 200 OK to the P-CSCF. Then in the step S538, the P-CSCF transmits a 200 OK to the S-CSCF. Then in the step S539, the S-CSCF transmits a 200 OK to the AS. Then in the step S540, the AS transmits a 200 OK to the S-CSCF. Then in the step S541, the S-CSCF transmits a 200 OK to the I-CSCF. Then a 200 OK is triggered for the AES so that the AES transmits a re-INVITE request to the user A (i.e., the first party or the first call leg). Nothing is returned to the ACP. Then in the step S542, the I-CSCF transmits a 200 OK to the AES. Then in the step S543, the AES transmits an ACK to the S-CSCF. Then in the step S544, the S-CSCF transmits an ACK to the AS. Then in the step S545, the AS transmits an ACK to the S-CSCF. Then in the step S546, the S-CSCF transmits an ACK to the P-CSCF. Then in the step S547, the P-CSCF transmits an ACK to the user B. At this time the user B has a real bearer path established to the user A, but the user A knows nothing about UE-B.

Next reference is made to FIG. 5(c). The AES uses the response from the second party to include a real SDP in a re-INVITE message transmitted to the first party. In the step S548, the AES transmits a re-INVITE (UE-A, SDP-B). Then in the step S549, the S-CSCF transmits a re-INVITE to the AS. Then in the step S550, the AS transmits a re-INVITE to the S-CSCF. Then in the step S552, the S-CSCF transmits an OCR (update) to the OCS. Then in the step S553, the OCS transmits a CCA (update) to the S-CSCF. Then in the step S554, the S-CSCF transmits a re-INVITE to the P-CSCF. Then in the step S555, the P-CSCF transmits a re-INVITE (SDP-B) to the user A.

Then in the step S556, the user A transmits a 200 OK (SDP answer) to the P-CSCF. Then in the step S557, the P-CSCF transmits a 200 OK to the S-CSCF. Then in the step S558, the S-CSCF transmits a 200 OK to the AS. Then in the step S559, the AS transmits a 200 OK to the S-CSCF. Then in the step S560, the S-CSCF transmits a 200 OK (SDP answer) to the AES. Then in the step S561, the AES transmits an ACK to the S-CSCF. Then in the step S562, the S-CSCF transmits an ACK to the AS. Then in the step S563, the AS transmits an ACK to the S-CSCF. Then in the step S564, the S-CSCF transmits an ACK to the P-CSCF. Then in the step S565, the P-CSCF transmits an ACK to the user A.

This scenario assumes that user A accepts but does not change the SDP-B provided by the user B. However this is not a safe assumption, and instead the AES shall transmit an INVITE message without any SDP to one of the parties and then uses an SDP included in an SIP response from that party and transmits it directly to the other party as an SDP in an INVITE request. Then an SDP answer from the one party is transmitted to the other party. All Then IP bearer traffic is established between gateway BGWs, IP bearer traffic is established between the BGW and the user equipment B, and IP bearer traffic is established between the BGW and the user equipment A, so that the UE-A now has a real bearer path established to the UE-B.

Those ordinarily skilled in the art can appreciate and make other modifications to the disclosed embodiments upon review of the description, the disclosure, the drawings and the appended claims. In the claims, the term "comprising" will not preclude another element(s) or step(s), and the term "a/an" will not preclude plural. In a practical application of the invention, an element may perform functions of more than one technical feature recited in a claim(s). Any reference numerals in the claims shall not be construed as limiting the scope of the invention.

The invention claimed is:

1. A method, in a serving-call session control function of an IP multimedia subsystem, of providing online charging for a guest user who has subscribed to a service of an application content provider and has a wildcard public user ID in a home user server of said IP multimedia subsystem, the method comprising:

transmitting, from the serving-call session control function, a domain name trigger message to an application exposure suite, to verify the user information of a guest user when a registration request from the interrogating call session control function is received, wherein the domain name trigger message includes the domain name of the guest user and wherein the application exposure suite has a standardized interface to the application content provider;

receiving, from the application exposure suite, a message including the success of failure and the registration interval of time to the serving-call session control function;

transmitting, from the serving-call session control function, an authentication request to the home user server when the message from the application exposure suite is received, the authentication request including a domain name of the guest user;

receiving, at the serving-call session control function an authentication response message from the home user server, the response message including information indicating whether the domain name is included in a list of valid public user identities in the home user server or the application content provider;

creating, by the serving-call session control function, an online charging procedure of the user when the domain name is included in the list of legal public user identities.

2. The method according to claim 1, wherein the credit control request further includes a payment option of the guest user.

3. The method according to claim 1, wherein the transmitting is performed by either of:

transmitting a multimedia authentication request in the Diameter protocol to the home user server when the registration request from the interrogating-call session control function is received, the multimedia authentication request including the domain name of the user; or transmitting a domain name trigger message to the application content provider when the registration request from the interrogating-call session control function is received, the domain name trigger message including the domain name of the user.

4. A method, in an interrogating-call session control function of an IP multimedia subsystem, of authenticating a guest user, the method comprising:

transmitting an authentication request to a home user server, the authentication request including a domain name of the guest user who has registered at an application content provider but not at a mobile network, who has a wildcard public user identifier (ID) stored in a home subscriber server (HSS) of said IP multimedia subsystem;

receiving a response message from the home user server, the response message including information indicating whether the domain name is included in a list of valid public user identities;

transmitting a credit control request to an online charging system, the credit control request including an identity of the guest user and the domain name of the guest user; and initiating a registration request to a serving-call session control function when the domain name is included in the list of valid public user identities.

* * * * *